United States Patent [19]
von Kaler et al.

[11] Patent Number: 5,078,659
[45] Date of Patent: Jan. 7, 1992

[54] VARIABLE SPEED TRANSAXLE

[75] Inventors: Roland L. von Kaler, Tecumseh; Dale I. Havens, Addison, both of Mich.; Christian H. Thoma, St. Clement, Great Britain; George D. Arnold, St. Helier, Channel Islands

[73] Assignee: Unipat AG, Glarus, Switzerland

[21] Appl. No.: 535,462

[22] Filed: Jun. 8, 1990

[30] Foreign Application Priority Data

Dec. 11, 1989 [GB] United Kingdom ............... 8927920
Dec. 11, 1989 [GB] United Kingdom ............... 8927921
Mar. 14, 1990 [GB] United Kingdom ............... 9005699

[51] Int. Cl.$^5$ ............................................. F16D 39/00
[52] U.S. Cl. ........................................ 475/78; 475/83; 60/487; 60/491
[58] Field of Search ............... 475/78, 80, 83, 200; 60/487, 490, 491, 494, 468, 464

[56] References Cited

U.S. PATENT DOCUMENTS

| | | | |
|---|---|---|---|
| 2,220,636 | 11/1940 | Bischof | 60/487 |
| 2,583,704 | 1/1952 | Nicholls et al. | 60/485 |
| 2,939,342 | 6/1960 | Woydt et al. | 475/80 X |
| 3,765,183 | 10/1973 | Baurle | 60/491 |
| 4,271,725 | 6/1981 | Takao et al. | 475/83 |
| 4,283,968 | 8/1981 | Kalns | 475/200 X |
| 4,893,524 | 1/1990 | Ohashi et al. | 475/83 |
| 4,914,914 | 4/1990 | Inoue | 60/487 X |
| 4,979,583 | 12/1990 | Thoma et al. | 180/62 |

Primary Examiner—Leslie A. Braun
Assistant Examiner—Matthew Stavish
Attorney, Agent, or Firm—Young & Thompson

[57] ABSTRACT

A transaxle driving apparatus for a small-sized vehicle such as a grass-mowing lawn tractor, formed from a two-piece housing to encapsulate a hydrostatic transmission with associated reduction gearing and mechanical differential member. One housing element is provided with a vertical input shaft which is drivingly engaged to the hydraulic pump of the hydrostatic transmission by means of bevel gearing. A hydraulic motor of the hydrostatic transmission is provided with a motor shaft, a speed reduction shaft, and a differential gear unit attached to the axle shafts, all shafts other than the input shaft being disposed horizontally along the plane containing the longitudinal axis of the transaxle for economy and compactness.

34 Claims, 10 Drawing Sheets

VARIABLE SPEED TRANSAXLE

BACKGROUND OF THE INVENTION

The field of the invention relates to hydrostatic transmissions in association with transaxle driving apparatus for use in light grass-mowing tractors, and where in particular it becomes advantageous to manufacture the hydrostatic transmission and transaxle as one unitary item.

The present invention is directed towards providing improvements to hydrostatic variable speed transaxles of the type as shown in U.S. Pat. No. 4,979,583 entitled "Variable Speed Transaxle".

The prior application has disclosed therein an embodiment for a hydrostatic transmission wherein a vertically aligned input drive shaft of the transaxle is in driving engagement with the rotary cylinder member of the hydrostatic pump, and where the hydrostatic motor is connected via a gear train that includes bevel gearing, to the differential and axle drive shafts of the transaxle.

Pump and motor are fluidly coupled together by a valve member, the valve member being either supported directly by the housing of the transaxle, or by means of an intermediary plate.

In order to reduce noise and vibration from certain internal components, such as the valve member, in addition to also obtaining the most power efficient operating range for the hydrostatic transmission, it is preferrable to limit the maximum rotational speed of the pump and motor to a level below that of the engine.

This can be achieved by gear reduction as disclosed in U.S. Pat. No. 4,691,512, or through the use of two unequal sizes of pulley in a Vee belt drive train. The Vee-belt being used to transmit power from the vehicle's engine to the transaxle, speed reduction being obtained by the use of a small pulley on the engine shaft driving, by the Vee belt, a larger pulley on the transaxle input shaft. The degree of speed reduction being determined by the the ratio of the pulley diameters.

In the field of hydrostatic transmissions, speed reduction by Vee belt rather than by gearing has become widely used by the industry for economic reasons.

A typical grass-mower lawn tractor has a maximum forward speed of about 6 miles per hour, and is most frequently fitted with an internal combustion engine operating at a rotational speed of about 3,400 rev/min at full throttle. For reasons of efficient grass cutting, it is necessary to operate the cutting blades at about the same rotational speed as the engine.

To obtain a maximum vehicle forward speed of 6 mph, speed reduction is required between the engine and the drive wheels, the maximum rotating speed of the drive wheels being typically of the order of 110 rev/min. A proportion of this speed reduction being obtained by the Vee belt drive-line as already described, so that less final gear reduction is required inside the transaxle.

During the test and development of such a Vee belt drive system in a lawn tractor fitted with a prototype hydrostatic transaxle, it has been found that on occasion insufficient engine torque can be transmitted through the Vee belt to the hydrostatic transaxle, and furthermore, that the Vee belts wear out prematurely. Also the required tension in the Vee belt is such that during prolonged use, the belt becomes loose with the result that the transmittable power to the transaxle is further reduced.

A further disadvantage of obtaining a large speed reduction with a Vee belt drive, is that the cooling fan attached to the input shaft of the transaxle is rotating at less than engine speed. This can be a severe disadvantage during extremely hot spells in the summer as the oil viscosity of the power transmitting hydraulic fluid in the hydrostatic unit drops with temperature rise, causing a corresponding fall in speed performance of the tractor.

It has further been found that if the tension in the Vee belt is reduced to a point where it is slack by the engagement of the clutch pedal, a feature originally developed to satisfy a general market requirement to enable the tractor to be pushed manually, there is still sufficient belt contact with the drive pulley to prevent easy belt slipping.

What is needed in the art is an improved transaxle assembly with a hydrostatic transmission for use with a vertical aligned input shaft operating at approximately the same rotational speed as the engine for reasons of both efficient torque transmission and fan cooling, with speed reducing bevel gearing disposed between the input shaft and the hydrostatic pump for improved operation. What is further needed is positive locking means for securing the hydrostatic pump and motor to the housing in order to reduce noise and vibration, an effective fluid circuit breaker means to enable the vehicle to be manually pushed without engaging the engine, and a hydrostatic control shaft that can be coupled to either side of the tractor without difficulty.

SUMMARY OF THE INVENTION

In the present invention both the hydraulic pump and the motor of the hydrostatic transmission are mounted co-axially back-to-back within an axle assembly, with their rotating axis parallel to the rotating axis of the axle shafts attached to the drive wheels of the vehicle.

A bevel pinion gear attached and driven by the vertically aligned input shaft of the transaxle is used in combination with a larger bevel gear that is either formed as part or mounted to the cylinder unit of the hydraulic pump. These bevel gears providing speed reducing means for the hydraulic pump as well as converting the drive axis through ninety degrees from the vertical to the horizontal plane and therefore parallel with the wheel axis.

Location of such bevel gearing at the input end of the hydrostatic transmission, in a position between the input drive shaft and the cylinder barrel of the hydraulic pump, has the further advantage in that it encounters lower torque loadings than when positioned between the hydraulic motor and drive shafts of the transaxle. Therefore this invention teaches that bevel gear speed reducing means should be placed at the least torque loaded location in the transaxle, namely between the input shaft and the cylinder unit of the hydraulic pump, rather than in the more highly stress loaded area between the hydrostatic motor and differential. One object of the present invention is to provide an apparatus with an internally disposed hydrostatic transmission using a set of bevel gears between the input shaft and the hydrostatic transmission, and a spur gear train connecting the hydrostatic transmission to the differential gear axle, thereby reducing the overall number of component parts in the apparatus in addition to also simplifying manufacture and assembly.

Another object of the present invention is to provide suitable means for securely retaining the hydrostatic pump and motor to the housing of the transaxle.

A further object of the invention is to provide suitable means for releasing oil pressure within a fluid coupling member between pump and motor of the hydrostatic transmission in order that the vehicle may be propelled without engaging the engine.

A further object of the invention is to overcome an applications problem which provides the tractor manufacture with the option of engaging the drive control linkage to either the left or the right side of the vehicle.

The invention therefore, as disclosed in these embodiments applies most beneficially to the type of hydrostatic transmission where a radial piston pump coupled to radial piston hydraulic motor, the pump and motor each comprising a rotary cylinder barrel providing generally radial cylinders which accommodate pistons co-operating with a surrounding annular track ring, both cylinder barrels being mounted on a common fixed cylindrical pintle valve member provided with internal fluid flow and return passages which form a closed hydraulic circuit. Preferably the cylindrical member is provided with check valves communicating with the machine chamber and arranged to open automatically to admit make-up fluid to the circuit.

The cylindrical member is preferrably clamped to one of the two housing elements by means of one or more saddle clamps or "U" bolt means in order to provide sufficient stiffness and support. Alteratively, the cylindrical member may be either fixed and non-rotatably mounted directly between the two housing elements of the axle by way of an interference fit, or in the case of more expensive transaxles, secured to a separate sandwich plate that is itself secured between the two transaxle housing elements.

The hydrostatic transmission is totally encapsulated inside a purposely formed internal chamber between the two transaxle housing elements. As a result, these housing elements of the transaxle take over the role of the usually used hydrostatic transmission housing and therefore act as the enclosure means for the complete hydrostatic transmission assemblage.

According to the preferred embodiment of the invention the cylindrical member of the hydrostatic transmission is located and locked by a saddle clamp to one of the housing elements of the transaxle, and where the mating faces of the transaxle housing elements abut on a plane generally containing the longitudinal axis of the axle shafting.

The output shaft of the hydraulic motor is in driving engagement with the differential axle through a two train reduction gear set.

These and other objects of the invention will become more apparent in the detailed description and examples which follows.

BRIEF DESCRIPTION OF THE DRAWINGS

The above mentioned and other features and objects of the invention, and the manner of attaining them, may be performed in various ways and will now be described by way of examples with reference to the accompanying drawings, in which.

DETAILED DESCRIPTION OF THE PREFERRED EMBODIMENT

Almost all manufacturers of light duty lawn tractor grass mowers prefer to install vertical crankshaft internal combustion engines to such vehicles, thereby enabling them to fit simple belt drives from the engine to the mower deck and transaxle.

The engine can be mounted on the chassis of the vehicle either over the front or rear wheels, whereas the transaxle is almost always mounted in a position close to or directly over the rear drive wheels.

This installation allows a simple Vee belt operating in the horizontal plane to transfer engine power from the engine pulley to a drive pulley keyed to the input shaft of the transaxle.

Figure 1:
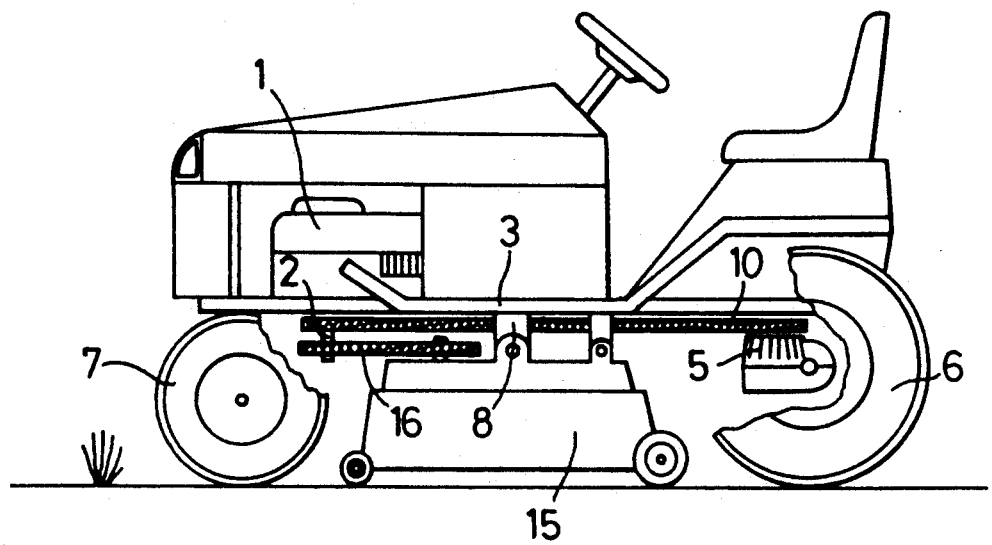
FIG. 1 is a side view of a typical grass cutting lawn or garden tractor vehicle.
Figure 2:
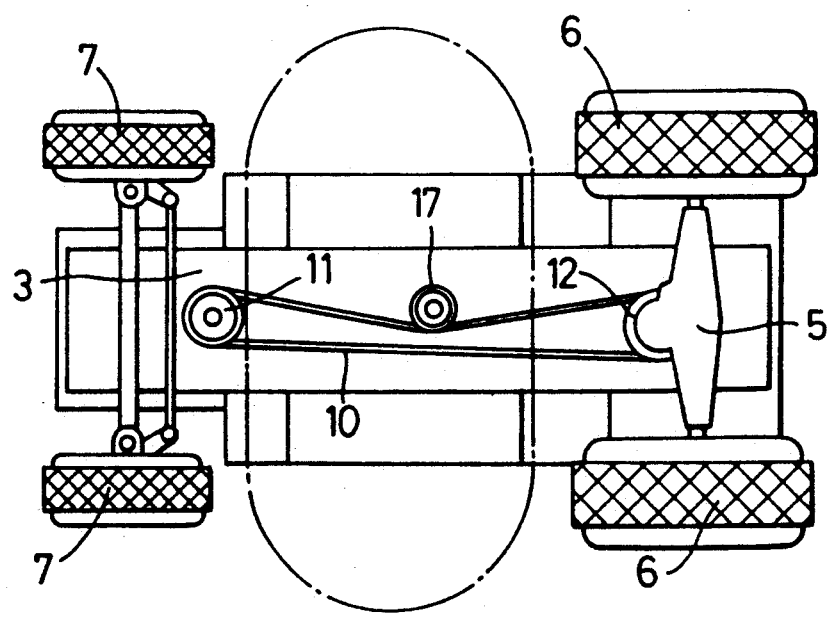
FIG. 2 is an underneath view of the vehicle in FIG.1.

The tractor vehicle illustrated in FIGS. 1 and 2 comprises a vertically installed internal combustion engine 1 with the crank shaft 2 pointing down to the ground. The engine 1 is shown mounted at the front end of the tractor chassis 3, and the transaxle 5 containing an internally disposed hydrostatic transmission is mounted towards the rear of the tractor chassis 3 and engaged to the rear drive wheels 6. A Vee belt 10 operating in the horizontal plane connects the engine pulley 11 with the input drive pulley 12 of the transaxle 5, with a simple jockey pulley 17 acting as tensioning means for the Vee belt as shown in FIG. 2. On occasion, a clutch pedal connected via linkages to the jockey pulley 17 is required to release the tension of the Vee belt before the engine is started.

In FIG. 1, a grass mower deck 15 is shown located beneath the vehicle chassis 3 in a position between the rear two drive wheels 6 and the front two steering wheels 7 of the tractor The mower deck 15 is attached to the tractor chassis 3 by way of height-adjusting supports 8 and is driven from the engine 1 by means of a short Vee belt 16.

The present invention relates to a hydrostatic transaxle 5 and internally disposed hydrostatic unit and in the preferred embodiment shown in FIGS. 3 to 7, the hydrostatic unit comprises a hydraulic pump 20 fluidly coupled to a hydraulic motor 21. Upper 22 and lower 23 housing elements enclose the hydrostatic unit in a chamber 38 which also contains the hydraulic fluid for the hydrostatic unit, the housing elements being attached together by a plurality of bolts which are inserted through holes 24.

Figure 3:
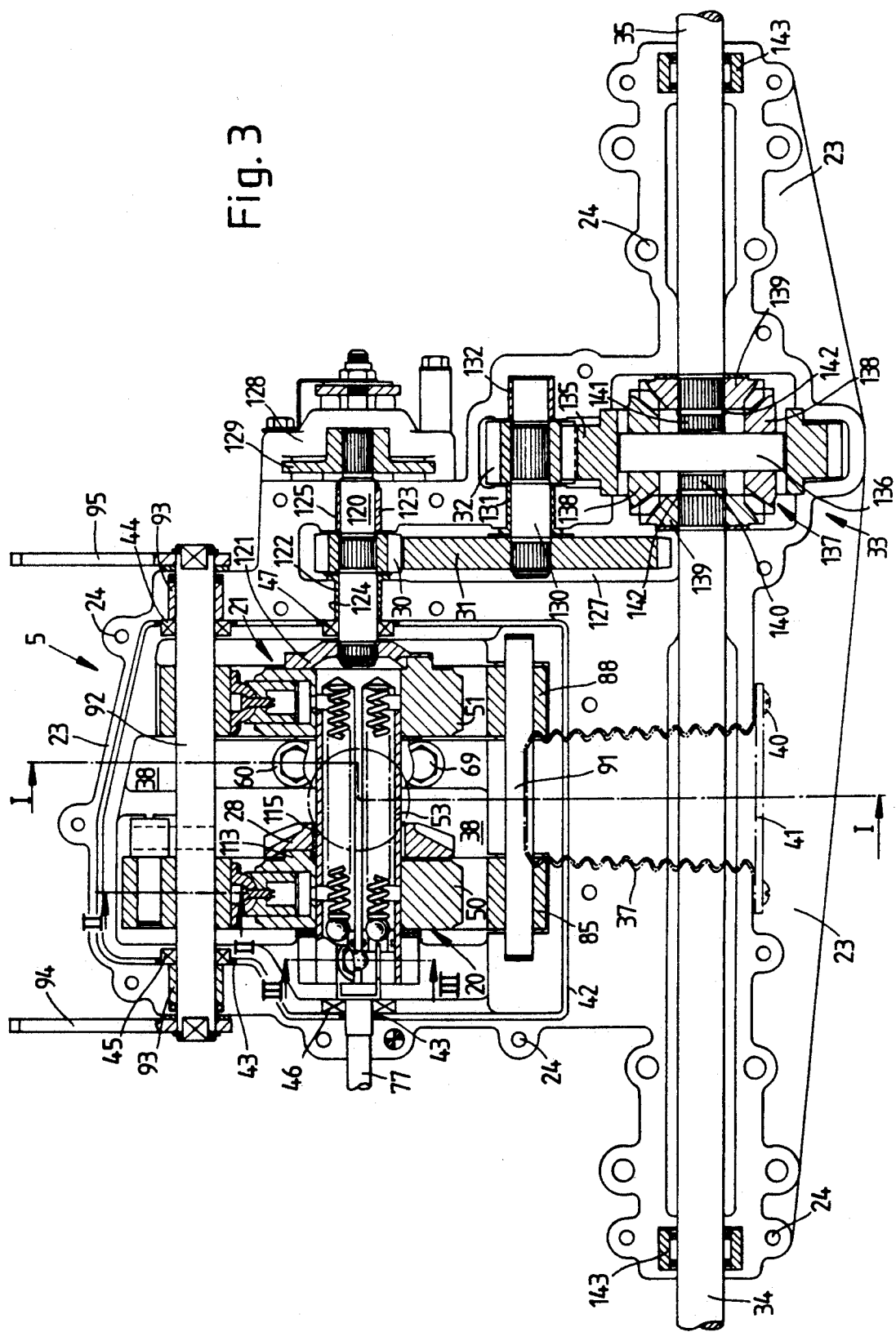
FIG. 3 is a plan view downwards of the preferred embodiment of the transaxle according to the invention, where the upper housing element is removed to show the internal components.
Figure 4:
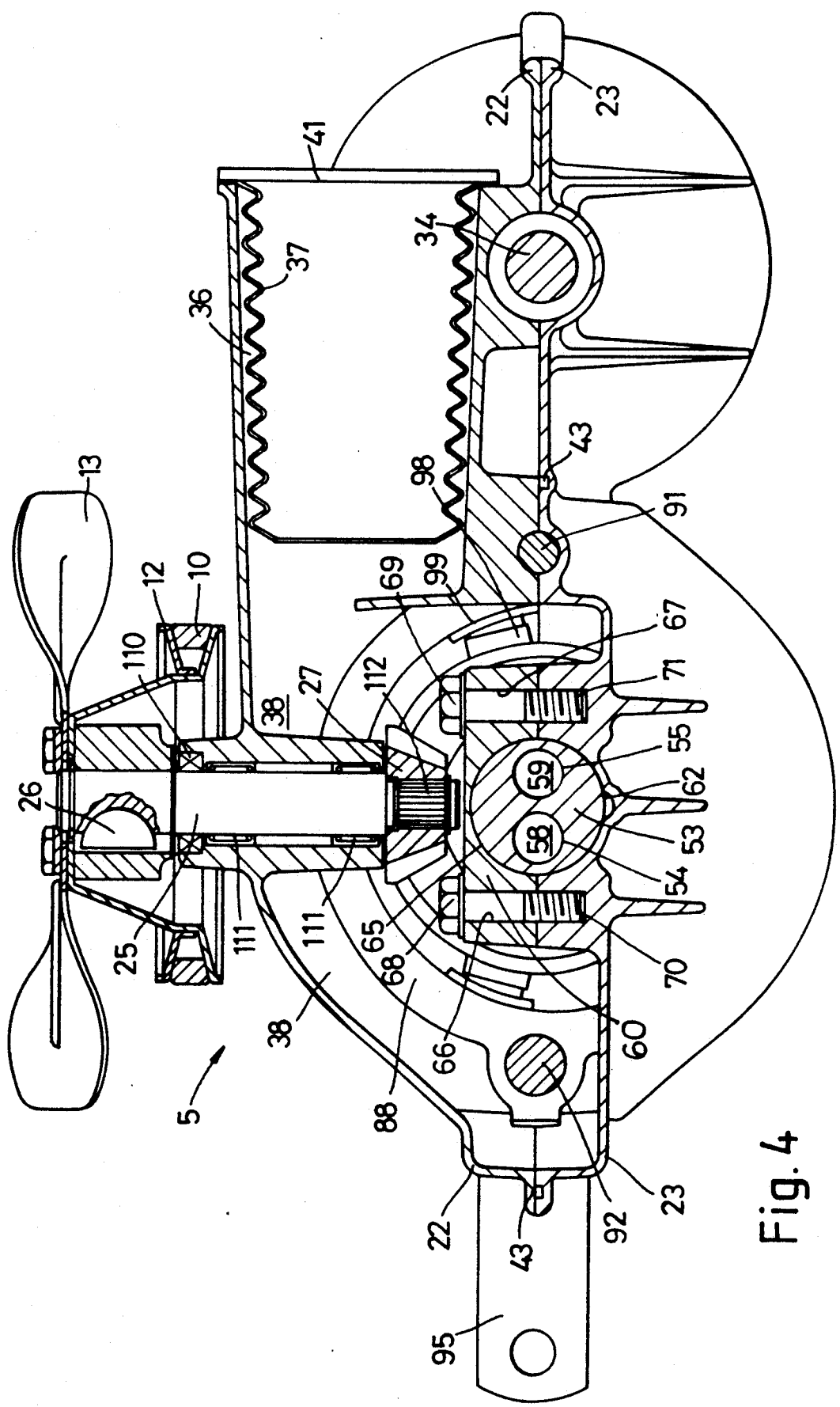
FIG. 4 is a part sectioned side view on line I—I of FIG. 3 of the transaxle as viewed from the left wheel side of the lawn tractor.

The drive pulley 12 and fan 13 shown in FIG. 4 are in driving engagement with the protruding end of the input shaft 25 of the transaxle 5. At the other end of the input shaft 25 is a bevel gear pinion 27, fixedly mounted. Gear 27 driving a larger diameter bevel gear 28 shown in FIG. 3 that engages with the hydraulic pump 20.

Reduction gear train comprising gears 30, 31 and 32 is included to connect the hydraulic motor 21 to a mechanical differential component 33, and where differential component 33 engages with stub shafts 34, 35 to form the vehicle's driving axle.

Housing elements 22, 23 being separable at a parting plane generally containing the longitudinal axes of the stub shafts 34, 35 of the transaxle 5, and formed to include an integral oil expansion chamber 36 shown in FIG. 4. The addition of an expandable bag element 37 inside chamber 36 as described in U.S. Pat. No. 4,987,796, allows the contraction and expansion of the oil due to temperature fluctuation within the main oil chamber 38 of the hydrostatic pump 20 and motor 21.

A number of screws 40 holding a flat cover plate 41 to the transaxle housing element 22 also provides location and retention of the expandable bag element 37 within chamber 36.

A groove 42 is provided on lower housing element 23 to seat an 'O' ring type seal 43 to prevent hydraulic fluid from escaping from the main chamber 38 of the hydrostatic unit. The 'O' ring 43 being formed to seal directly against shaft seals 44, 45, 46 and 47. However, sealing compound may also be used as an alternative to the 'O' ring.

Hydraulic pump 20 and motor 21 of hydrostatic unit are ideally mounted coaxially back-to-back with their rotating axis parallel with the rotating axis of the axle stub shafts 34, 35, and their construction being generally similar with minor points of difference as described below.

Figure 5:
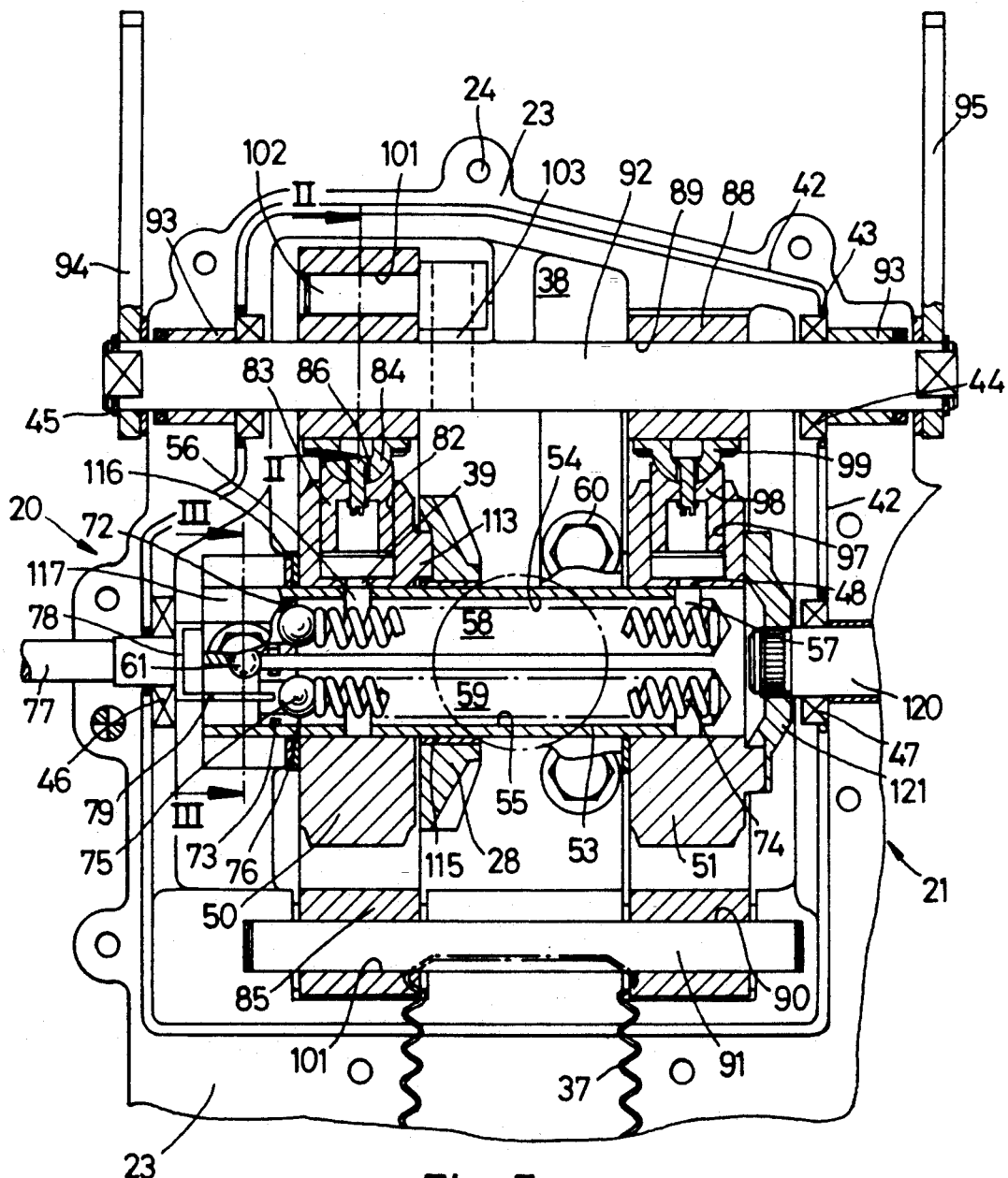
FIG. 5 is a plan view of the hydrostatic transmission of FIG. 3.

Both hydraulic pump 20 and motor 21 shown in FIG. 5 comprises a rotary cylinder barrel 50, 51 respectively mounted to rotate at each ends of a cylindrical fluid coupling member 53. To enable rotation of both pump 20 and motor 21, the cylindrical member 53 is generally circular in shape and preferrably has two cylindrical tubes 54 and 55 located within its outer walls. Cylindrical member 53 provides an axis for the rotation of cylinder units 50, 51, and is provided with arcuate shaped ports 56, 57, and oil passages 58, 59 within tubes 54, 55 to allow fluid communication between pump 20 and motor 21.

In the preferred embodiment, cylindrical member 53 is rigidly secured to the lower housing element 23 of the transaxle 5, by combined means of both a saddle clamp 60 and a bolt 61.

Figure 7:
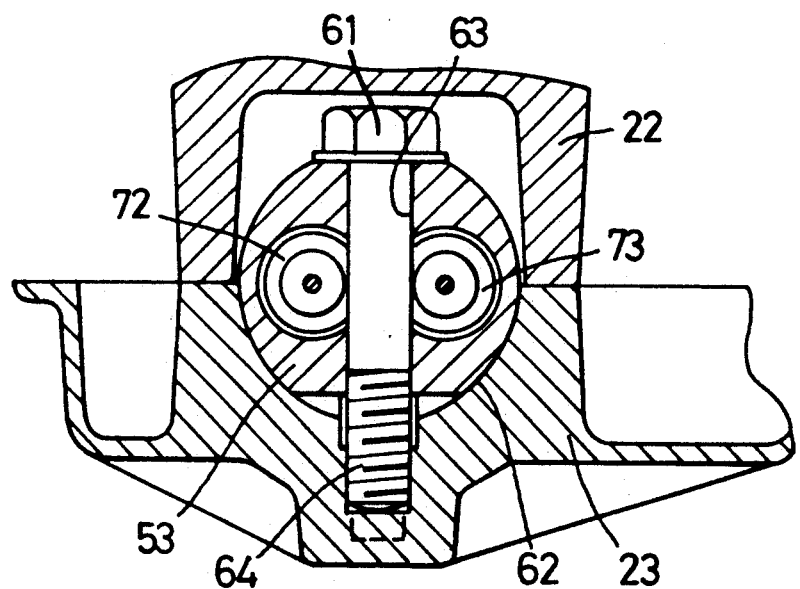
FIG. 7 is a part sectioned side view on line III—III of FIG. 3 showing the cylindrical member of the transaxle.

Cylindrical member 53 is located in a channel 62 formed in the lower housing element 23. A radial hole 63 is provided near the end of the cylindrical member 53 as shown in FIG. 7 into which a threaded bolt 61 is inserted to engage with a threaded hole 64 in the lower housing element 23. The bolt 61 acts both to axially and angularly position the cylindrical member 53 in the channel 62, as well as helping the saddle clamp 60 retain the cylindrical member 53 to the lower housing element 23.

Angular alignment of cylindrical member 53 for correct port timing 56, 57 with ducts 39, 48 in the cylinder units 50, 51 is critical in order to acheive power efficient operation and low operational noise, as known to those skilled in the art.

The saddle clamp 60 shown in FIG. 4. comprises a member formed with a channel profile 65, which is placed over the cylindrical member 53 to locate in place between channels 62 and 65. Saddle clamp 60 is formed with two holes 66, 67 into which threaded bolts 68, 69 are inserted which then engage with threaded holes 70, 71 positioned in the lower housing element 23. Once saddle bolts 68 and 69, and alignment bolt 61 are tightened, the cylindrical member 53 is rigidly secured to the lower housing element 23.

As alternatives, cylindrical member 53 may either be secured and supported directly between the housing elements 22, 23, or be inserted into a separate sandwich plate which is secured between the two housing elements 22, 23. On occasions, it may become necessary to use such a sandwich plate member in order to improve the securing of the cylindrical member, when for example, working oil pressures within the hydrostatic unit are much higher. A description of such a sandwich plate member is described in our U.S. Pat. No. 4,979,583.

Bolt 61 which is used to axially and angularly align cylindrical member 53 within channel 62, is also preferrably used to retain check valves 72, 73 located within the tubes 54, 55 near one end of cylindrical member 53.

Check valves 72, 73 are provided so that oil can be discharged from the hydrostatic unit to relieve excessive pressure, to change the oil, or to supply additional oil into the oil passages 58, 59. Each check valve 72, 73 comprises a spring 74 that acts to position a steel ball 75 in close proximity to the oil discharge opening seat 76 of the check valve.

As ball 75 of each check valve 72, 73 is located near one end of the cylindrical member 53, it is advantageous to incorporate a slidable plunger 77 and fork 78 combination. When the plunger 77 is depressed in towards the transaxle 5, the fork member 78 which includes a pair of pronges 79 which push each ball 75 off its respective seat 76 so that the usually closed hydraulic circuit 58, 59 within the cylindrical member 53 is opened, thus allowing the vehicle to be manually pushed without engaging the engine 1. An oil seal 46 surrounds the plunger member 77 in order to prevent the escape of hydraulic fluid from oil chamber 38 to the environment.

Cylinder unit 50 for the hydraulic pump 20 comprise a plurality of cylinders 82 which are a fixed axial distance relative to the ports 56 formed in cylindrical member 53. Each cylinder 82 includes a duct 39 which matches with pintle ports 56 during rotation of cylinder unit 50.

Each cylinder 82 receives a piston 83 which is attached to a slipper shoe 84, these components rotating according to the cylinder unit 50 within a surrounding annular track ring 85. Each piston 83 is attached to a slipper 84 by means of a connecting pin 86, and where the slippers act against the track ring 85.

The slippers 84 may be radially urged against the track ring 85 by means of a discontinuous expander band as described in U.S. Pat. No. 4,635,535. Such an expander band is not shown in the embodiments in order not to confuse the drawings.

If the annular track ring 85 of the hydraulic pump 20 is adjusted to be eccentrically positioned around the cylindrical member 53, rotation of the cylinder unit 50 with its piston 83 and slipper 84 members, causes the pistons 83 to reciprocate radially within their respective cylinders 82.

In the case of the hydraulic motor 21, the annular track ring 88 remains permanently set in eccentric relation to the cylindrical member 53, and is purposely provided with two holes 89 and 90 into which a pin 91 and the control shaft 92 pass through for support. The control shaft 92 is supported by bearings 93 at each end of transaxle housing with oil seals 44 and 45 preventing hydraulic oil seeping out from the oil chamber 38 of the hydrostatic unit.

The control shaft 92 extends through the housing elements 22,23 and is shown connected to manual control lever 94 and 95 positioned at either ends. In practice, it is normal to use only one lever for controlling the vehicle's speed. However, the option of connecting the lever at either end of the control shaft does allow the tractor manufacturer greater flexibility. For instance, most tractor manufacturers prefer to install the speed control linkage to the right side of the transaxle for front engined tractors, but in the case of rear engined tractors where the transaxle is mounted back to front, this invention allows the lever to be connected to either side.

Some tractor manufactures may also decide to use levers at both ends of the control shaft, one being expressly used for vehicle speed control, the other being linked to the clutch engaging jockey pulley in order to bring the vehicle to a stop by means of pulling the control shaft back to the neutral setting for the hydrostatic unit.

The cylinder unit 51 for the hydraulic motor 21 is identical to that of the hydraulic pump 20, and comprises a plurality of cylinders 97 each receiving a piston 98. Pistons 98 are attached to slippers 99, and both rotate according to the cylinder unit 51 within the annular track ring 88.

During operation, oil under pressure acts behind the piston 98 in the cylinder 97 causing piston 98 to reciprocate radially within its cylinder 97. As track ring 88 is mounted eccentric with the cylindrical member 53, a turning action is created and rotation of the cylinder unit 51 occurs.

In order to deliver pressurized fluid to translate the rotation of pump cylinder unit 50 to the motor cylinder unit 51, the circles defined by cylindrical member 53 and track ring 85 must be eccentric.

The hydraulic pump 20 is therefore arranged to be capable of adjustment so as to vary its fluid output capacity and thus the speed ratio of the hydrostatic transmission. This is achieved by means of supporting track ring 85 on a pin 91 which acts as the pivot point for the track ring 85. The pin 91 extends through track ring and is supported between the housing elements 22,23. The pin 91 is fixed in position relative to cylindrical member 53, while track ring 85 has a limited ability to rotate, the pin 91 being aligned generally parallel to the rotary axis of the hydrostatic pump 20.

Track ring 85 is provided with a hole 101 into which a projecting pin 102 is inserted which engages with an adjusting arm 103 attached to the control shaft 92.

Projecting pin 102 and adjusting arm 103 allow movement of the control shaft 92 and translates the rotary movement of the externally operated lever 95 attached to the control shaft 92, into lateral swinging movement of the track ring 85.

Figure 6:
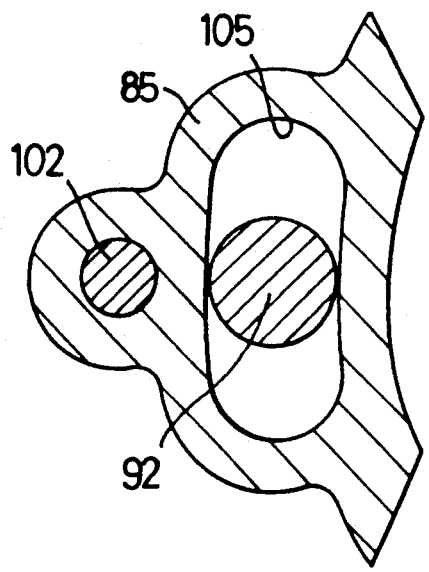
FIG. 6 is a part sectioned view of the pump track ring on line II—II of FIG. 3.

As a result, the hydrostatic transmission ratio is thereby altered as the track ring 85 pivots about the pin 91, thus varying the eccentric position of the track ring 85 relative to the cylindrical member 53. A slot 105 located in the track ring 85 as shown in FIG. 6. allows the control shaft 92 to pass through. This is necessary in order to allow the track ring 85 to rotate on pivot pin 91 without touching the control shaft 92.

Movement of lever 95 by the vehicle operator causes the control shaft 92 to rotate, and by means of arm 103 and pin 101, track ring 85 pivots through a small angle on pin 91. A degree of eccentricity of the track ring 85 is produced and thus, the effective fluid output capacity of the hydrostatic pump 20 is altered, with the result that the vehicle's speed is changed.

A Vee belt 10 transmits mechanical power from the vertically aligned crank shaft engine 1 of the vehicle, to a pulley 12 and fan 13, keyed 26 to input drive shaft 25. Shaft 25 extending through the upper housing element 22 of the transaxle 5 into the oil chamber 38 of the hydrostatic unit.

Oil seal 110 on upper housing element 22 seals input shaft 25, and two needle bearings 111 are included to rotationally support shaft 25.

Shaft 25 transmits mechanical power to the rotary cylinder unit 50 of the hydraulic pump 20 by means of a bevel pinion 27 and gear 28, the bevel pinion 27 being splined at 112 to the input shaft 25 and bevel gear 28 being mechanically coupled at 113 to the cylinder unit 50. Bevel gear 28 is supported on the cylindrical member 53 by means of a bearing bush 115.

The use of such bevel gearing allows the drive axis to be turned through ninety degrees from the vertical to the horizontal.

By this structure, rotation is imparted to hydraulic pump 20 at a lower level than the rotational speed of drive pulley 12. This also results in efficient cooling for the transaxle 5 by way of the fan 13 rotating at a higher speed than the hydraulic pump 20, and thereby providing a larger volume of air passing over the transaxle housing elements 22,23.

The bevel gear 28 driving the cylinder unit 50 of the hydraulic pump 20 produces an axial thrust load which is effectively countered by the insertion of a thrust washer 116 disposed between the cylinder unit 50 and a wall 117 provided in the housing elements 22,23 of the transaxle 5.

Hydraulic fluid (e.g.oil) is circulated within hydrostatic unit to transmit motion from the input shaft 25 by converting the motion to fluid pressure by the hydraulic pump 20, and then by converting the fluid pressure to motion by hydraulic motor 21 for driving first shaft 120.

The hydraulic motor 21 is connected to first shaft 120 by means of a misalignment coupling 121 such as the well known "oldham" type.

First shaft 120 is supported on two bearings 122, 123 which are located in pockets 124, 125 formed in the lower and upper housing elements 22,23. An oil seal 47 disposed between the coupling 121 and inner bearing 122 prevents fluid loss from the hydrostatic oil chamber 38 from seeping into the gear train compartment chamber 127.

First shaft 120 is preferrably extended axially to a brake assembly 128 having a disc 129, and a shifting mechanism (not shown) are included with transaxle 5; brake assembly 128 being of a conventional type, and the shifting mechanism being similar to the one disclosed in U.S. Pat. No. 3,812,735.

Primary gear 30 is splined to first shaft 120, and meshes with larger intermediate gear 31 which is splined to second shaft 130. Bearings 131, 132 support second shaft 130, and gear pinon 32 is splined to second shaft 130.

Differential 33 which is in driven mesh with gear pinion 32, comprises ring gear 135, drive centre pin 136, and bevel gear assembly 137. . Bevel gear assembly 137 includes bevel gears 138 and bevel gears 139, which together with drive centre pin 136 are carried within the interior of ring gear 135 in a manner which is known in the art. Proximal ends 140,141 of the stub axles 34,35 respectively, are received through bevel gears 139 and abut against drive centre pin 136. Stub axles 34,35 are retained in place by retainer rings 142.

Bevel gear assembly 137 of the differential 33 acts to transmit the drive from the ring gear 135 to the axle stub shafts 34,35 and the rear drive wheels 6 of the tractor as known to those skilled in the art. The inclusion of a differential 33 is important as it allows normal differentiation between the left and right drive wheels of the vehicle and helps prevent lawn damage especially when tight turns are undertaken.

Stub axles 34,35 are ideally supported by needle bearings 143, but can also be supported directly on the material of the housing elements for low duty applications.

As a result, the complete transaxle package comprising hydrostatic unit and output gear train is very compact and comprises fewer component parts than prior axles known to date.

By appropriate selection and movement of the speed control lever 95, vehicle operator adjusts the eccentricity of track ring 85 of the hydraulic pump 20.

As a result, the speed ratio of the hydrostatic unit is changed, as for example, for forward motion of the vehicle, rotation of the input shaft 25 drives through the bevel pinion 27 and gear 28, engaging at 113 with cylinder unit 50 of the hydraulic pump 20.

Rotation of cylinder unit 20 and the consequent radial reciprocating action of pistons 83, causes fluid to flow out from cylinder 82 through duct 39 into the arcuate port 56 in the cylindrical member 53.

The oil flows along passage 58 towards the hydraulic motor 21, and out through arcuate port 57 of cylindrical member 53 and into duct 144 in the cylinder unit 51 of the hydraulic motor 21.

The oil passing through duct 144 into cylinder 97 acts against piston 98 causing the piston 98 to move towards the open end of the cylinder 97.

As a consequence of annular track ring 88 being eccentrically mounted relative to the centre of the cylindrical member 53, the engaging slipper 99 act through an angle, and the force from the pressurized oil acting behind piston 98 and angled slipper 99, produces a turning moment to the cylinder unit 51 of the hydraulic motor 21.

The rotating cylinder unit 51 is coupled 121 to first shaft 120 and causes gear 30 to turn. Gear 31 is driven by gear 30, and gear 31 is splined to second shaft 130, and this shaft 130 also has a further splined portion to drive gear pinion 32.

Gear pinion 32 drives ring gear 135 of differential 33 which includes associated bevel gear assembly 137, that acts to transfer mechanical power to the axle stub shafts 34, 35 and the rear drive wheels 6 of the tractor.

In further embodiments shown in FIGS. 8 to 12, only those features that are not common to the preferred embodiment shown in FIGS. 3. to 7 will be described in detail. Features which are substantially the same are designated by the same numerals as for the earlier embodiment.

Figure 8:
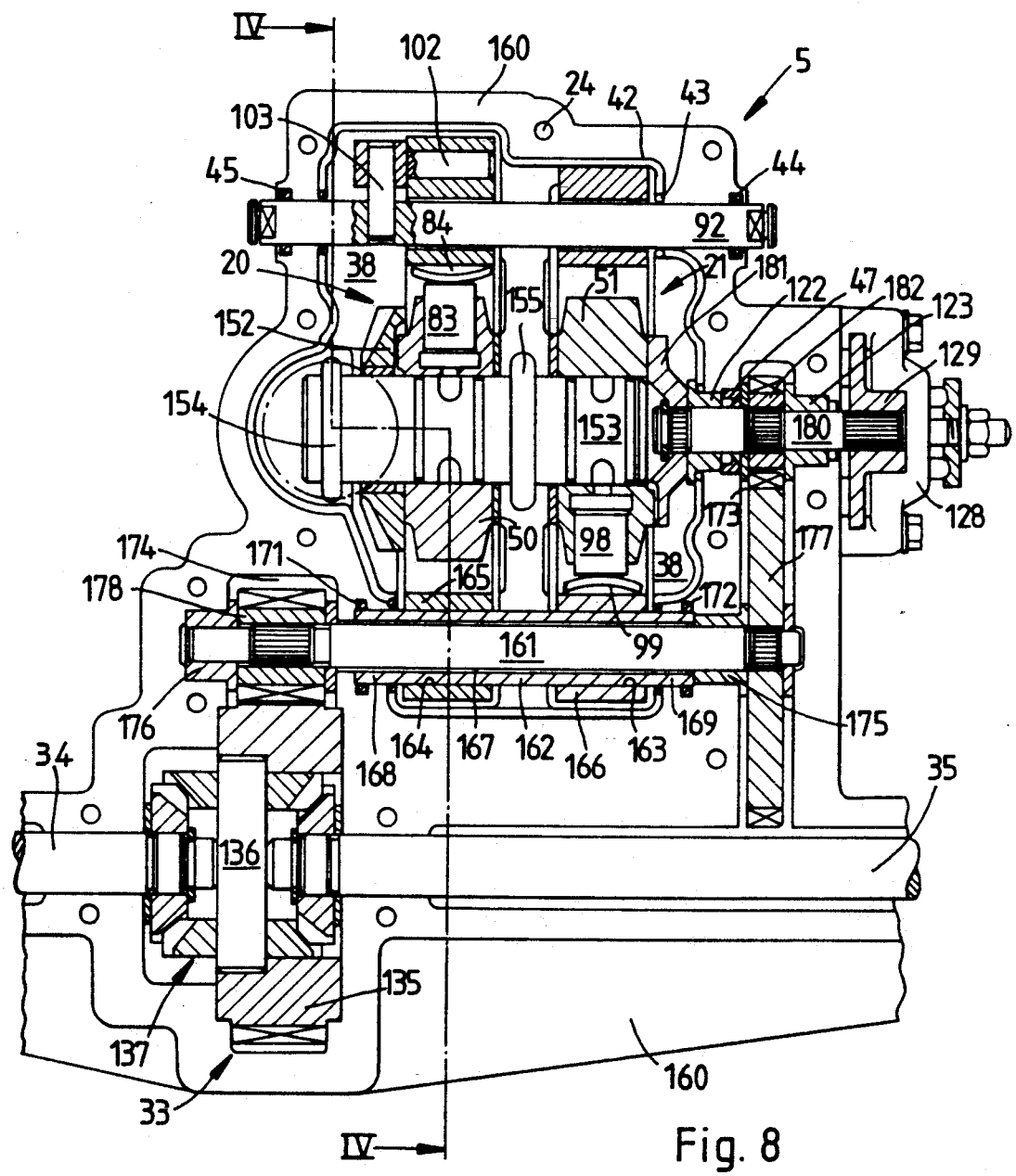
FIG. 8 is a plan view downwards of a further embodiment of the transaxle according to the invention, where the upper housing element is removed to show the internal components.
Figure 9:
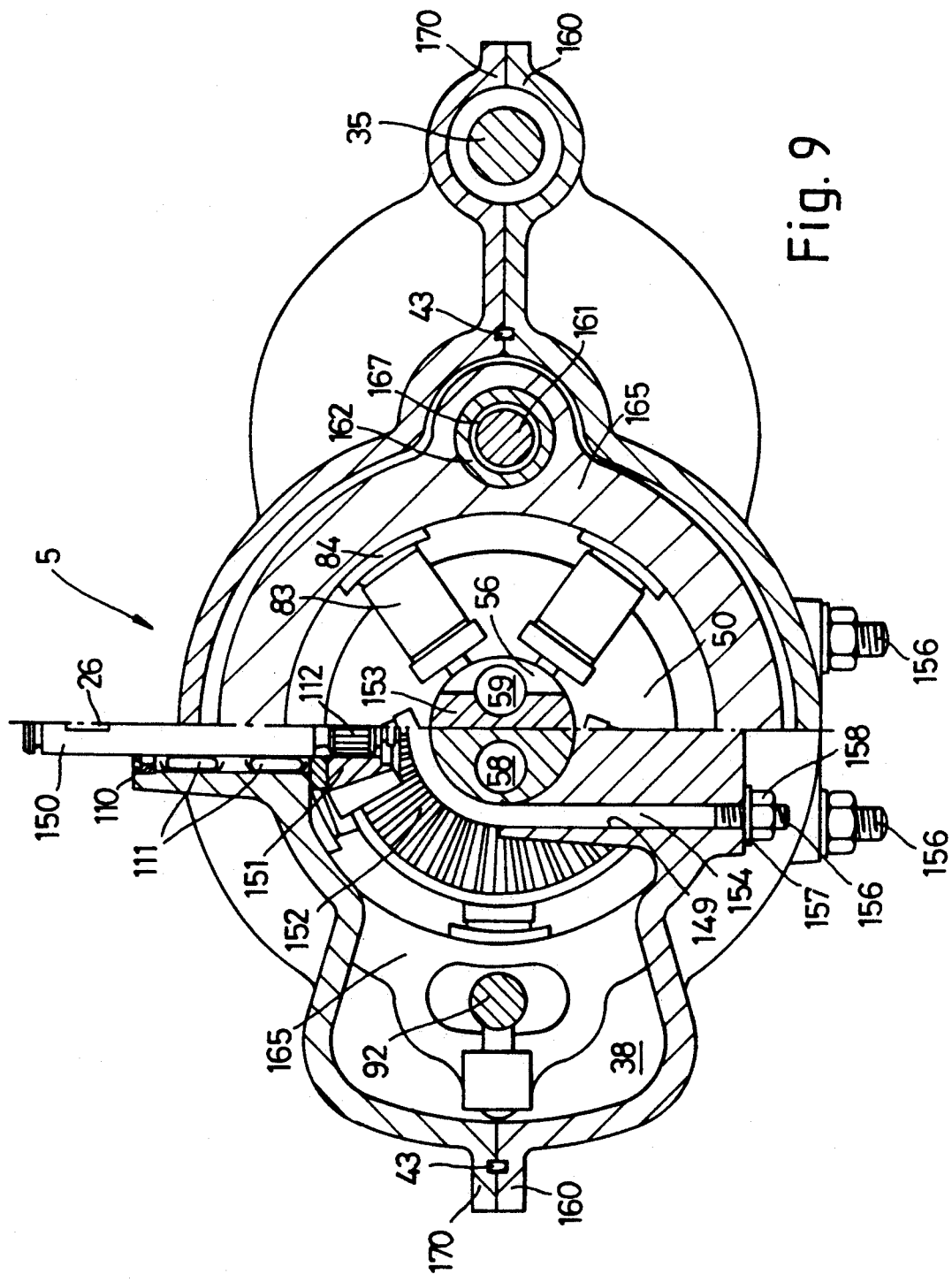
FIG. 9 is a part sectioned side view on line IV—IV of FIG. 8 of the transaxle as viewed from the left wheel side of the lawn tractor.

The transaxle embodiment in FIGS. 8 and 9 has an input drive train comprising input shaft 150, bevel pinion 151 and gear 152 located near one end of cylindrical member 153, as opposed to location in the centre between the hydraulic pump 20 and hydraulic motor 21 of the hydrostatic drive as disclosed in the preferred embodiment.

FIGS. 8 and 9 discloses alternative means for securing cylindrical member 153 and comprises two "U" bolt type clamps 154, 155. The ends 156 of both bolts 154,155 are threaded and pass through holes 149 in the lower housing element 160 so that a washer 157 and nut 158 can be spun on the threaded ends 156 and tightened thereby resulting in cylindrical member 153 being held firmly down into channel 159 formed in the lower housing element 160.

It is a further feature of this embodiment to pass second shaft 161 through a tube 162 in order to achieve overall compactness of the transaxle.

The tube 162 passes through holes 163,164 provided in each track ring 165,166 and acts both, as the pivotting member for pump 20 track ring 165, and as a fixed support for motor 21 track ring 166.

A small annular clearance 167 is provided inside the tube 162 in order to prevent rotating second shaft 161 from touching the tube 162. The ends 168,169 of the tube 162 are supported directly between housing elements 160,170 with oil seals 171,172 preventing hydraulic in oil chamber 38 from seeping into either primary gear compartment 173 or secondary gear compartment 174.

Second shaft 161 supported on bearings 175,176 is axially extended in order to engage with gears 177 and 178 disposed at each end, and thereby linking primary 173 to secondary 174 gear compartments.

The cylinder unit 51 of hydraulic motor 21 is connected to first shaft 180 by coupling 181. Gear 182 in splined engagement with first shaft 180 and meshes with gear 177. Pinion gear 178 splined to second shaft 161 is meshed to ring gear 135 of differential 33.

Figure 10:
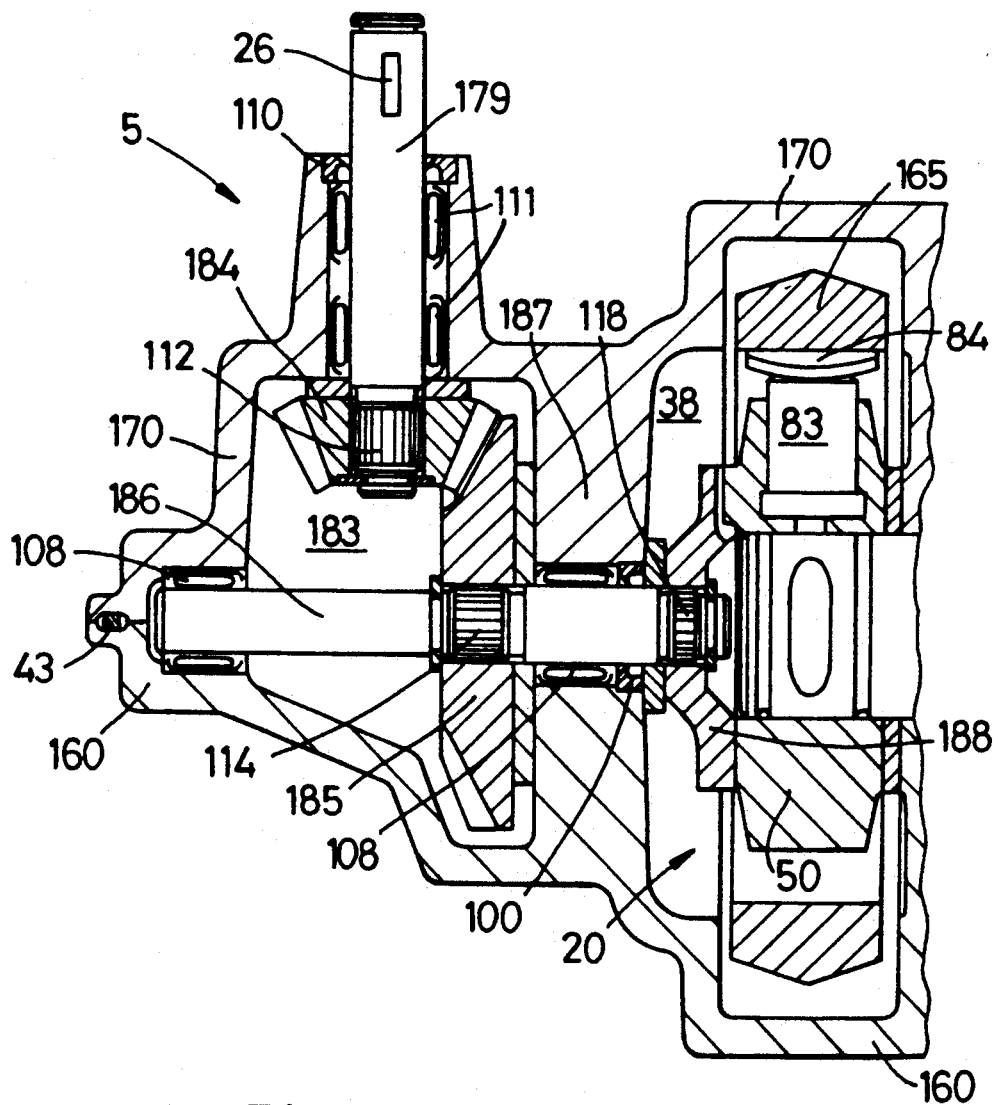
FIG. 10 a part sectioned side view of a alternative embodiment of FIG. 8 allowing the location of the bevel gearing in a separate compartment within the transaxle.

On occasion, it may be advantageous to locate the bevel pinion and gear within a separate compartment as illustrated in FIG. 10. In this embodiment, input drive shaft 179 supported by bearings 111 extends through upper housing element 170 of the transaxle 5 into primary compartment 183.

Bevel pinion 184 is splined 112 to input drive shaft 179, and is drivingly engaged to bevel gear 185.

Shaft 186 rotationally supported by means of needle bearings 108 and splined 114 to engage bevel gear 185. Shaft 186 passes through a partition wall 187 formed by housing elements 170,160 where an oil seal 100 prevents the escape of hydraulic fluid from oil chamber 38 into primary compartment 183. At the end of the shaft 186, a further spline 118 is provided to drive through a coupling 188 to the cylinder unit 50 of the hydraulic pump 20.

The advantage of this embodiment being that bevel gearing 184,185 rotate in their own bath of lubricant thereby eliminating any contamination from the gears from reaching the oil chamber 38 of the hydrostatic unit.

Figure 11:
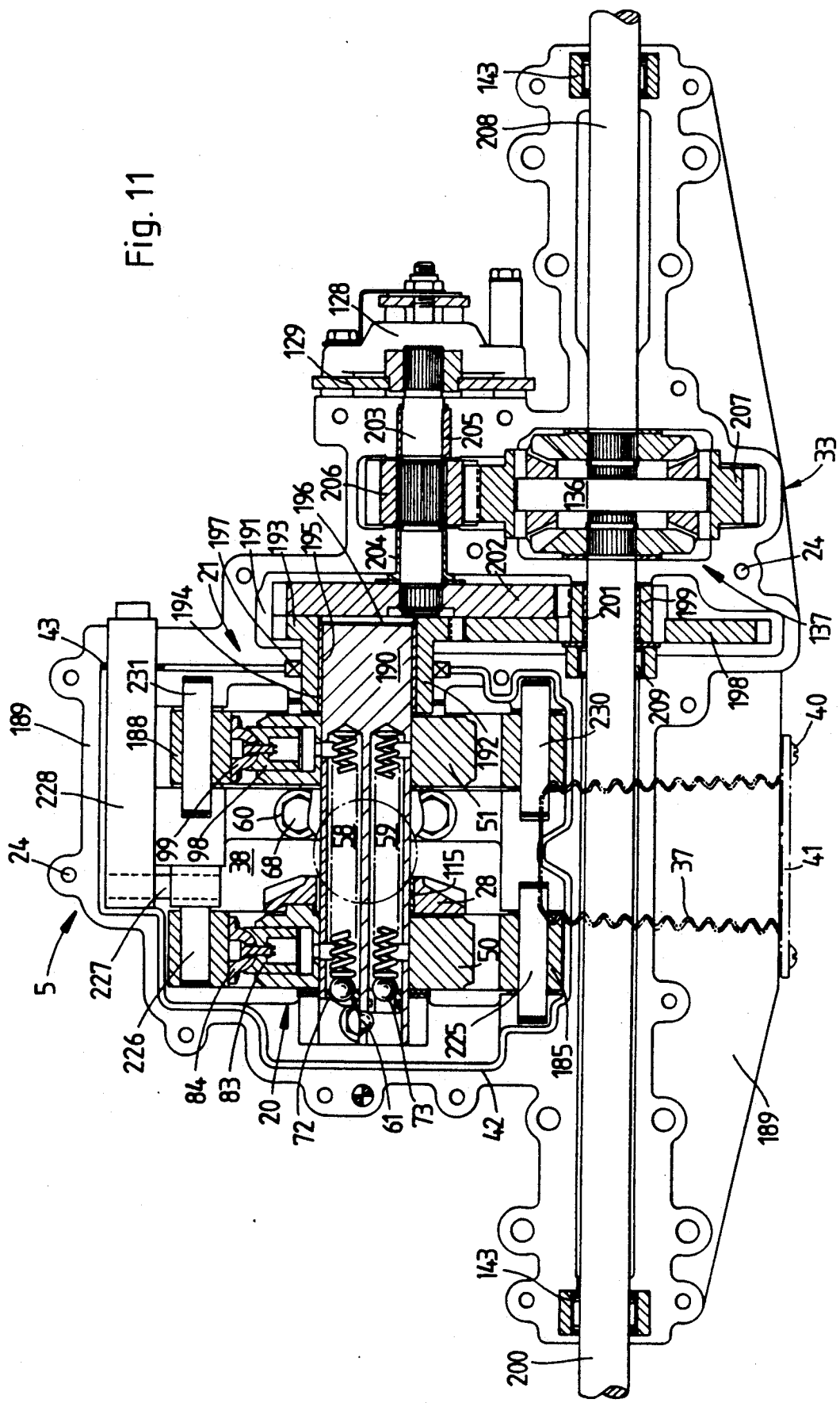
FIG. 11 is a plan view downwards of a further embodiment of the transaxle according to the invention, where the upper housing element is removed to show the internal components.

A further hydrostatic transaxle embodiment shown as FIG. 11 discloses means for obtaining a larger amount of reduction gearing ratio between the hydraulic motor 21 and the mechanical differential 33 than the earlier embodiments.

Cylindrical member 190 is mounted to lower housing element 189 by means of a saddle 60 and bolt 61 as described for the preferred embodiment. In this embodiment, cylindrical member 190 is extended axially to pass through into gear train compartment 191.

Drive connecting member 192 is formed with gear teeth 193 at one end, and engages at 194 with the cylinder unit 51 of the hydraulic motor 21 at its other end.

Drive connecting member 192 is supported on cylindrical member 190 by plain bearing 195, and a cap 196 is used to close off the exposed end of cylindrical member 190 to prevent hydraulic oil from seeping out of chamber 38 past plain bearing 195 into gear train compartment 191.

Furthermore, oil seal 197 is positioned over the cylindrical portion of drive connecting member 192 to prevent loss of hydraulic fluid from chamber 38. The seal 197 combines with 'O' ring 43 located in groove 42 that surrounds the hydrostatic unit.

Gear teeth 193 on drive connecting member 192 drives a larger gear 198 which is in direct mesh with gear 199 supported on the left hand stub axle 200 by means of a plain bearing 201.

Gear 199 drives gear 202 on final drive shaft 203. The final drive shaft 203 is supported on plain bearings 204,205 and supports and drives pinion 206 which is in meshed engagement with ring gear 207 of differential 33.

Differential 33 connects with axle stub shafts 200,208 as described for the earlier embodiment, which the exception that an extra needle bearing 209 is disposed next to gear 199 for stub axle shaft 200. In this embodiment, brake assembly 128 is connected to protruding end of final drive shaft 203.

The vehicle speed control system differs in type to that already described in the earlier embodiments, but operates in similar fashion as follows.

Track ring 185 of hydraulic pump 20 is pivotally mounted on a transverse pin 225, and is further connected by moveable hinge pin 226, link pin 227 to control shaft 228 attached to an externally operated lever (not shown). As control shaft 228 is turned, the eccentricity of track ring 185 is altered in relation to the centre of cylindrical member 190, and as a result, the volumetric oil flow of the hydraulic pump 20 and hence the hydrostatic unit is altered. Control shaft 228 protrudes from the transaxle housing on one side rather than both as shown in the earlier embodiments. However, if desired, the control shaft may also protrude from both sides of the transaxle housing as illustrated in the earlier embodiments.

The track ring 188 of the hydraulic motor 21 is held in an eccentric position to the cylindrical member 190 by being supported on two pins 230,231.

Figure 12:
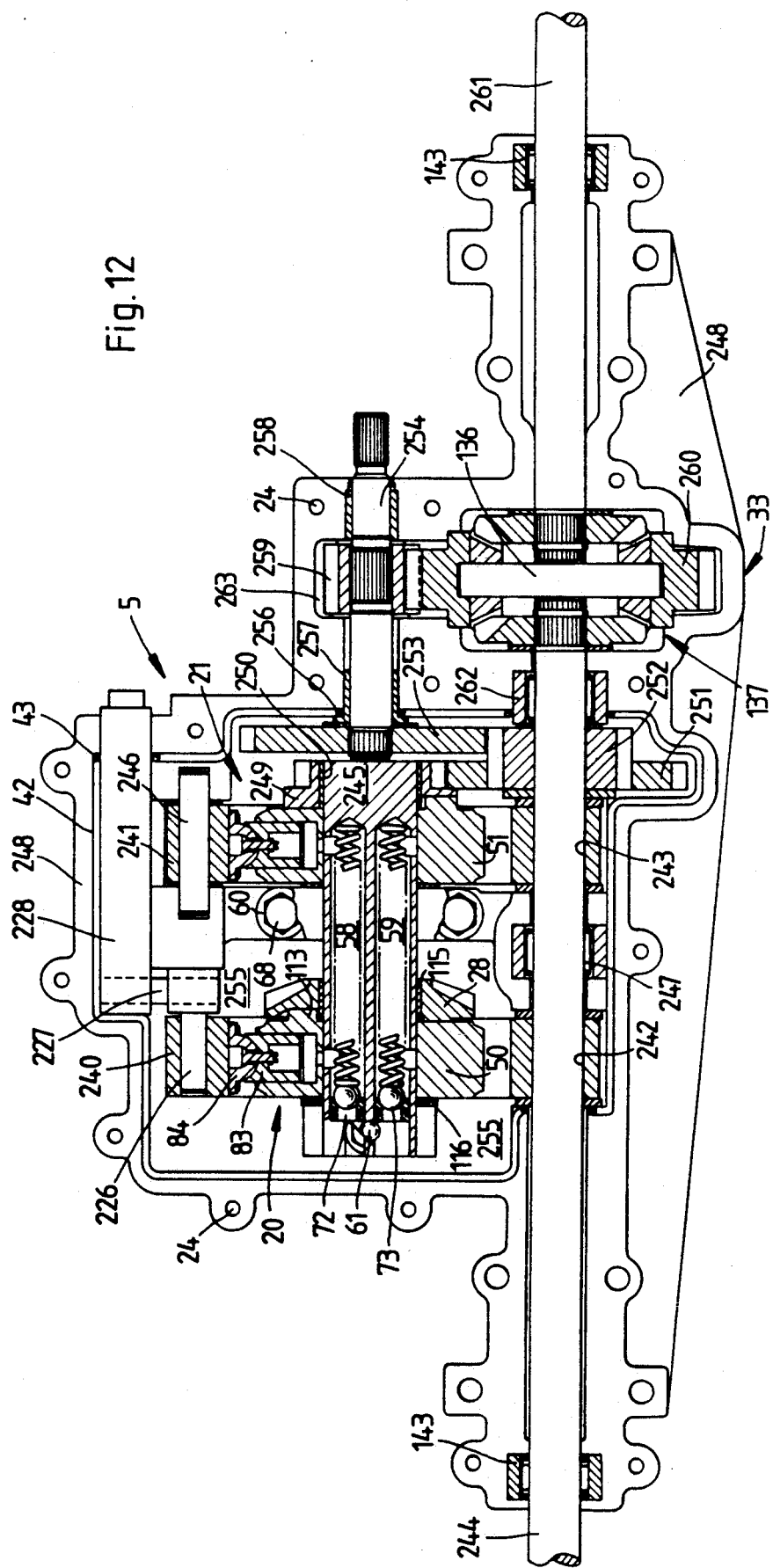
FIG. 12 is a plan view downwards of a further embodiment of the transaxle according to the invention, where the upper housing element is removed to show the internal components.

The final embodiment shown as FIG. 12 differs in one main respect to the last embodiment described, in that the hydrostatic unit and the first portion of the final reduction gear train is located within the same internal oil chamber Due to the possibility of material worn from the gears contaminating the oil chamber for the hydrostatic unit, it is expected that the life span of a hydrostatic transaxle of this type may be shorter than that obtained from the previous embodiments.

However, an advantage of this embodiment being that the transaxle becomes more compact than those embodiments already described, as preferably one of the axle stub shafts are arranged to pass through holes provided in the track ring members. As a result, the front to back dimension of the housing is reduced with significant savings in material.

Track rings 240,241 are manufactured with sufficiently large holes 242,243 to allow the passing through of axle stub shaft 244. Track ring 240 of the hydraulic pump 20 pivots directly on stub axle 240 in a similar manner as for pin 91 in FIG. 5.

The track ring 241 of the hydraulic motor 21 is held in an eccentric position to cylindrical member 245 by being supported on pin 246 and stub shaft 244.

A needle bearing 247 is disposed between the track rings 240, 241 on the stub axle 244 in order to support the hydrostatic loads which act directly on stub axle 244.

However, in order to avoid the hydrostatic loads being imposed directly to stub axle 244, in some instances it may be desirable to include a tube around the stub axle 244 in a similar manner as already described for tube 162 in the embodiment shown as FIGS. 8 and 9.

Cylindrical member 245 is mounted to lower housing element 248, and has a gear 249 supported by bearing 250 at one of its ends.

Gear 249 is is in driving engagement with cylinder unit 51 of the hydraulic motor 21, and drives via an intermediate gear 251 to gear 252 supported on the stub axle 244. Gear 252 is formed sufficiently wide to drive larger gear 253 which is splined to final drive shaft 254. Gears 249,251,252,253 being disposed within oil chamber 255 of the hydrostatic unit, and an oil seal 256 positioned on bearing 257 to prevent oil from seeping from chamber 255 into secondary reduction gear train compartment 263. Final drive shaft 254 is supported by bearings 257,258 and has a pinion gear 259 drivingly mounted between the bearings 257,258 which engages with ring gear 260 on the differential assembly 33.

Differential 33 connects with axle stub shafts 244,261 as described for the earlier embodiment, which the exception that two extra needle bearings 247, 262 are required to support the extra load imposed on on stub axle shaft 244.

Although the invention discloses a hydrostatic transmission of the general type where the pistons are arranged radially within a rotatable cylinder member, several of the disclosed features can also be applied with advantage to the type of rotatable cylinder unit employing pistons arranged axially.

It is to be understood that while we have illustrated and described four embodiments of our invention, it is not to be limited to any one specific form or arrangement of parts herein described and shown except insofar as such limitations are included in the claims.

What is claimed is:

1. An axle assembly comprising:
   a housing including two main housing elements connected together along a parting plane and defining first and second internal chambers;

a hydrostatic transmission encapsulated in said first chamber and including a hydrostatic pump fluidly coupled to a hydrostatic motor by means of a fluid coupling member non-rotatably supported in said housing;

a primary shaft rotatably mounted in one said housing element and extending into said first chamber for engagement with a first bevel gear;

a second bevel gear rotatably supported on said fluid coupling member and drivingly engaged to said first bevel gear;

said second bevel gear drivingly connected to said hydrostatic pump;

axle shaft means rotatably supported in said housing and having its axis substantially coincident with said parting plane; and differential gearing means within said second chamber drivingly connected between said hydrostatic motor and said axle shaft means;

wherein at least two hydraulic fluid passages are provided within said fluid coupling member to fluidly link said hydrostatic pump to said hydrostatic motor.

2. An ale assembly of claim 1 wherein said axle shaft means comprises a pair of coaxial shafts.

3. An axle assembly of claim 1 wherein said first bevel gear comprises a relatively small diameter gear and said second bevel gear comprises a relatively larger diameter gear.

4. An axle assembly of claim 1 wherein said cylindrical member is disposed in parallel relationship to said axle shaft means.

5. An axle assembly of claim 1 wherein said housing includes a partition wall separating said first and second chamber.

6. An axle assembly of claim 5 wherein said partition wall supports a seal ring, said seal ring positioned to surround said first chamber to prevent the escape of hydraulic fluid contained within said first chamber.

7. An axle assembly of claim 1 wherein said fluid coupling member is fixed and non-rotatably mounted to at least one said housing element by means of one or more saddle clamps, said fluid coupling member being cylindrical.

8. An axle assembly of claim 7 wherein said cylindrical member is axially and angularly positioned within a channel formed in at least one housing member by means of a bolt.

9. An axle assembly of claim 1 wherein said fluid coupling member is fixed and non-rotatably mounted to at least one said housing element by means of one or more U shaped bolts, said fluid coupling member being cylindrical.

10. An axle assembly of claim 9 wherein said cylindrical member is axially and angularly positioned within a channel formed in at least one housing member by means of a bolt.

11. An axle assembly of claim 1 wherein said fluid coupling member is cylindrical and said hydraulic fluid passages connect with two paris of arcuate shaped ports provided on said cylindrical member.

12. An axle assembly of claim 11 wherein said first and second hydraulic fluid passages are extended to break out at one end face of said fluid coupling member, and a check valve is mounted to each said first and second hydraulic passages at said end face of said cylindrical member.

13. An axle assembly of claim 12 wherein said check valves are retained in respective said hydraulic passages by means of a pin member positioned transversely to the longitudinal axis of said fluid coupling member.

14. An axle assembly of claim 1 wherein each said check valve includes a ball and a spring, said ball being positioned between said spring and a respective seat in said check valve.

15. An axle assembly of claim 12 wherein said mechanical means comprises an externally operatable shaft member with a forked end portion within said first chamber, said forked end portion engaging with said balls of said check valves when said externally operatable shaft member is operated.

16. An axle assembly of claim 5 wherein said fluid coupling member is axially extended at one end to pass through said partition wall into said second chamber to rotatably support a first geared element of said differential gearing means.

17. An axle assembly of claim 16 wherein said first geared element is drivingly engaged to said hydrostatic motor.

18. An axle assembly of claim 11 wherein said hydrostatic pump and said hydrostatic motor each include a rotary cylinder unit comprising a plurality of radially arranged cylinders and a plurality of pistons disposed in said cylinders, said cylinders successively communicating with said arcuate shaped ports during rotation of said rotary cylinder unit, each said rotary cylinder unit rotatably mounted on said cylindrical member.

19. An axle assembly of claim 18 wherein a respective annular track ring surrounds each said cylinder unit, said pistons of each respective said cylinder units being operatively connected to said track ring, and where each said track ring is formed with a cavity to allow the passage of a speed control shaft.

20. An axle assembly of claim 19 wherein said speed control shaft is axially extended at each end to protrude through said housing.

21. An axle assembly of claim 18 wherein a respective annular track ring surrounds each said cylinder unit, said pistons of each respective said cylinder units being operatively connected to a said track ring, and where each said track ring is supported by a pivot pin.

22. An axle according to claim 21 wherein a power transmitting shaft is arranged to pass through an aperture provided in said pivot pin, said power transmitting shaft drivingly engaged to a spur type gear at each end.

23. An axle assembly of claim 18 wherein a respective annular track ring surrounds each said cylinder unit, said pistons of each respective said cylinder units being operatively connected to a said track ring, and where each said track ring is formed with a cavity to allow the passage of one of said axle shaft means.

24. An axle of claim 1 wherein said differential gearing means comprises at least a pair of spur type gears.

25. An axle assembly comprising:

a housing including two main housing elements connected together along a parting plane and defining at least one internal chamber;

a hydrostatic transmission encapsulated in said chamber and including a hydrostatic pump fluidly coupled to a hydrostatic motor;

a primary shaft rotatably mounted in one said housing element and extending into said chamber for engagement with a first bevel gear;

a second bevel gear rotatably supported on a cylindrical fluid conduit member and drivingly engaged to said first bevel gear, said fluid conduit member including hydraulic passages connecting said pump and motor;

said second bevel gear drivingly connected to said hydrostatic pump;

axle shaft means rotatably supported in said housing; and differential gearing means within said housing drivingly connected between said hydrostatic motor and said axle shaft means;

wherein one end face of said cylindrical fluid conduit member is exposed and locates check valves in said hydraulic fluid passages and further locates mechanical means for operating said check valves.

26. The axle assembly of claim 25 wherein said second bevel gear is disposed between said pump and said motor.

27. The axle assembly of claim 25 wherein said motor is connected to a shaft coaxial with said cylindrical fluid conduit member and said shaft is drivingly connected between said motor and said differential gearing means.

28. The axle assembly of claim 25 including saddle clamp means extending around said cylindrical fluid conduit means and fastening said fluid conduit means to the other said housing element.

29. The axle assembly of claim 25 wherein said hydraulic passages are extended to break out at one end face of said cylindrical fluid conduit member and a check valve is mounted to each said passage at said end face of said fluid conduit member.

30. An axle assembly comprising:

a housing including two main housing elements connected together along a parting plane and defining first and second and third internal chamber;

a hydrostatic transmission encapsulated in said second chamber and including a hydrostatic pump fluidly coupled to a hydrostatic motor;

a primary shaft rotatably mounted in one said housing element and extending into said first chamber for engagement with a first bevel gear;

a second bevel gear supported on a support shaft and drivingly engaged to said first bevel gear;

said support shaft being extended to pass into said second chamber to drivingly connect with said hydrostatic pump;

axle shaft means rotatably supported in said housing and having its axis substantially coincident with said parting plane, and differential gearing means within said third chamber drivingly connected between said hydrostatic motor and said axle shaft means.

31. An axle assembly of claim 30 wherein said first bevel gear comprises a relatively small diameter gear and said second bevel gear comprises a relatively larger diameter gear.

32. An axle assembly of claim 30 wherein said housing includes a partition wall separating said first and % second chambers.

33. An axle assembly of claim 32 wherein said partition wall supports a seal ring, said seal ring positioned to surround said second chamber to prevent the escape of hydraulic fluid contained within said second chamber.

34. An axle of claim 30 wherein at least a pair of gears are disposed within said third chamber and operatively connect said hydrostatic motor to said differential gearing means.

* * * * *

UNITED STATES PATENT AND TRADEMARK OFFICE
CERTIFICATE OF CORRECTION

PATENT NO. : 5,078,659

DATED : January 7, 1992

INVENTOR(S) : Roland L. VON KALER et al.

It is certified that error appears in the above—identified patent and that said Letters Patent is hereby corrected as shown below:

On the title page, under item [56] References Cited, U.S. PATENT DOCUMENTS, insert the following:

| | | | |
|---|---|---|---|
| 2,257,792 | 10/1941 | Fletcher | 60/53 |
| 3,199,297 | 8/1965 | Croswhite | 60/53 |
| 3,360,933 | 1/1968 | Swanson et al. | 60/53 |
| 3,376,703 | 4/1968 | Buczynski | 60/53 |
| 3,430,438 | 3/1969 | Weiss | 60/53 |
| 4,130,566 | 8/1978 | Von Kaler et al. | 74/701 |
| 4,686,829 | 8/1987 | Thoma et al. | 60/464 |
| 4,691,512 | 9/1987 | Thoma et al. | 60/456 |
| 4,781,259 | 11/1988 | Yamaoka et al. | 180/75 |
| 4,784,013 | 11/1988 | Yamaoka et al. | 74/606 |
| 4,843,818 | 7/1989 | Thoma et al. | 60/488 |
| 4,856,368 | 8/1989 | Fujisaki et al. | 74/606 |
| 4,862,767 | 9/1989 | Hauser | 74/687 |
| 4,870,820 | 10/1989 | Nemoto | 60/487 |
| 4,914,907 | 4/1990 | Okada | 60/487 |

On the title page, under item [56] References Cited, FOREIGN PATENT DOCUMENTS, insert the following:

| | | |
|---|---|---|
| 617,639 | 2/1949 | United Kingdom |
| 1,374,411 | 11/1974 | United Kingdom |

UNITED STATES PATENT AND TRADEMARK OFFICE
CERTIFICATE OF CORRECTION

PATENT NO. : 5,078,659

DATED : January 7, 1992

INVENTOR(S) : Roland L. Von Kaler et al

It is certified that error appears in the above-identified patent and that said Letters Patent is hereby corrected as shown below:

Column 13:

In claim 2, line 24, "ale" should be --axle--.
In claim 5, line 36, "chamber" should be --chambers--.
In claim 11, line 61, "paris" should be --pairs--.

Column 14:

In claim 19, line 34, --a-- should be inserted before "said tracking ring".

Column 16:

In claim 32, line 26, "%" should be deleted.

Signed and Sealed this

Fourth Day of May, 1993

*Attest:*

MICHAEL K. KIRK

*Attesting Officer*     *Acting Commissioner of Patents and Trademarks*